United States Patent
Kuroki et al.

(10) Patent No.: US 9,647,931 B2
(45) Date of Patent: May 9, 2017

(54) SYSTEMS, AND METHODS FOR REROUTING ELECTRONIC COMMUNICATIONS

(71) Applicant: FUJITSU LIMITED, Kawasaki-shi, Kanagawa (JP)

(72) Inventors: Satoshi Kuroki, Fukuoka (JP); Tatsuya Soneda, Fukuoka (JP); Hideki Nagino, Fukuoka (JP); Taiji Kondo, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 236 days.

(21) Appl. No.: 14/531,149

(22) Filed: Nov. 3, 2014

(65) Prior Publication Data
US 2015/0134786 A1    May 14, 2015

(30) Foreign Application Priority Data
Nov. 11, 2013   (JP) .................................. 2013-233347

(51) Int. Cl.
*G06F 15/16*    (2006.01)
*H04L 12/705*   (2013.01)
*H04L 12/725*   (2013.01)

(52) U.S. Cl.
CPC ............ *H04L 45/18* (2013.01); *H04L 45/306* (2013.01)

(58) Field of Classification Search
None
See application file for complete search history.

(56) References Cited

U.S. PATENT DOCUMENTS

| | | | | |
|---|---|---|---|---|
| 6,381,649 B1* | 4/2002 | Carlson | ............... | H04L 12/2602 370/230 |
| 7,177,295 B1* | 2/2007 | Sholander | ............... | H04L 45/30 370/338 |
| 8,000,315 B2* | 8/2011 | Doi | .......... | H04L 45/20 370/315 |
| 2006/0013177 A1* | 1/2006 | Saito | ....................... | H04L 45/26 370/338 |
| 2006/0268727 A1* | 11/2006 | Rangarajan | ............. | H04L 45/00 370/248 |
| 2008/0151889 A1* | 6/2008 | Yi | ........................... | H04L 45/00 370/235 |

(Continued)

FOREIGN PATENT DOCUMENTS

JP    2008-193318    8/2008

Primary Examiner — Thomas Dailey
(74) Attorney, Agent, or Firm — Staas & Halsey LLP

(57) ABSTRACT

A system includes first and second apparatuses configured to communicate with a server apparatus; and a third apparatus configured to transmit data to the first apparatus and record number of transfer of the data in the system, the data including information on a destination of the data and the number of transfer, wherein the first apparatus is configured to set the destination to the second apparatus and update the number of transfer, when receiving the data and not being allowed to communicate with the server apparatus, and transmit an updated data including information on the set destination and the updated number of transfer, to the third apparatus, and the third apparatus is configured to transmit the updated data to the second apparatus based on the set destination when the updated number of transfer is equal to or smaller than the recorded number of transfer when receiving the updated data.

8 Claims, 21 Drawing Sheets

(56) References Cited

U.S. PATENT DOCUMENTS

| | | | |
|---|---|---|---|
| 2011/0268013 A1* | 11/2011 | Levendel | H04W 40/248 370/315 |
| 2013/0170504 A1* | 7/2013 | Shimokawa | H04L 47/56 370/429 |
| 2014/0215052 A1* | 7/2014 | Seibert | H04L 41/069 709/224 |

* cited by examiner

FIG. 8A

| GS | FID | TRANSFER COUNT |
|----|-----|----------------|

GS: GLOBAL TRANSMISSION SOURCE ADDRESS
FID: FRAME IDENTIFIER
TRANSFER COUNT: THE NUMBER OF TIME FRAME HAS BEEN TRANSFERRED

FIG. 8B

| LD | LS | GD | GS | FID | TRANSFER COUNT |
|----|----|----|----|-----|----------------|

LD: LOCAL DESTINATION ADDRESS
LS: LOCAL TRANSMISSION SOURCE ADDRESS
GD: GLOBAL DESTINATION ADDRESS
GS: GLOBAL TRANSMISSION SOURCE ADDRESS
FID: FRAME IDENTIFIER
TRANSFER COUNT: THE NUMBER OF TIME FRAME HAS BEEN TRANSFERRED

FIG. 14

| FRAME MANAGEMENT TABLE | | | | FRAME FORMAT | | | | | |
|---|---|---|---|---|---|---|---|---|---|
| NODE | GS | FID | TRANSFER COUNT | LD | LS | GD | GS | FID | TRANSFER COUNT |
| A | A | 1 | 0 | B | A | GW1 | A | 1 | 0 |
| B | A | 1 | 0 | GW1 | B | GW1 | A | 1 | 0 |

FIG. 16

| NODE | FRAME MANAGEMENT TABLE | | | FRAME FORMAT | | | | | |
|---|---|---|---|---|---|---|---|---|---|
| | GS | FID | TRANSFER COUNT | LD | LS | GD | GS | FID | TRANSFER COUNT |
| A | A | 2 | 0 | B | A | GW1 | A | 2 | 0 |
| B | A | 2 | 0 | GW1 | B | GW1 | A | 2 | 0 |
| F-GW1 | A | 2 | 1 | B | FORMER GW1 | GW2 | A | 2 | 1 |
| B | A | 2 | 1 | C | B | GW2 | A | 2 | 1 |
| C | A | 2 | 1 | G | C | GW2 | A | 2 | 1 |
| G | A | 2 | 1 | H | G | GW2 | A | 2 | 1 |
| H | A | 2 | 1 | GW2 | H | GW2 | A | 2 | 1 |

FIG. 18

| NODE | FRAME MANAGEMENT TABLE | | | FRAME FORMAT | | | | |
|---|---|---|---|---|---|---|---|---|
| | GS | FID | TRANSFER COUNT | LD | LS | GD | GS | FID | TRANSFER COUNT |
| A | A | 3 | 0 | B | A | GW1 | A | 3 | 0 |
| B | A | 3 | 0 | GW1 | B | GW1 | A | 3 | 0 |
| FORMER GW1 | A | 3 | 1 | B | FORMER GW1 | GW2 | A | 3 | 1 |
| B | A | 3 | 1 | C | B | GW2 | A | 3 | 1 |
| C | A | 3 | 1 | G | C | GW2 | A | 3 | 1 |
| G | A | 3 | 1 | H | G | GW2 | A | 3 | 1 |
| H | A | 3 | 1 | GW2 | H | GW2 | A | 3 | 1 |
| H | A | 3 | 1 | C | H | GW2 | A | 3 | 1 |
| C | A | 3 | 1 | I | C | GW2 | A | 3 | 1 |
| I | A | 3 | 1 | GW2 | I | GW2 | A | 3 | 1 |

FIG. 20A

| NODE | FRAME MANAGEMENT TABLE | | | FRAME FORMAT | | | | | |
|---|---|---|---|---|---|---|---|---|---|
| | GS | FID | TRANSFER COUNT | LD | LS | GD | GS | FID | TRANSFER COUNT |
| A | A | 4 | 0 | B | A | GW1 | A | 4 | 0 |
| B | A | 4 | 0 | GW1 | B | GW1 | A | 4 | 0 |
| FORMER GW1 | A | 4 | 1 | B | FORMER GW1 | GW2 | A | 4 | 1 |
| B | A | 4 | 1 | C | B | GW2 | A | 4 | 1 |
| C | A | 4 | 1 | G | C | GW2 | A | 4 | 1 |
| ... | | | | | | | | | |
| I | A | 4 | 1 | GW2 | I | GW2 | A | 3 | 1 |

FIG. 20B

| NODE | FRAME MANAGEMENT TABLE | | | FRAME FORMAT | | | | | |
|---|---|---|---|---|---|---|---|---|---|
| | GS | FID | TRANSFER COUNT | LD | LS | GD | GS | FID | TRANSFER COUNT |
| A | A | 4 | 0 | B | A | GW1 | A | 4 | 0 |
| A | A | 4 | 0 | D | A | GW1 | A | 4 | 0 |
| D | A | 4 | 0 | E | D | GW1 | A | 4 | 0 |
| E | A | 4 | 0 | F | E | GW1 | A | 4 | 0 |
| F | A | 4 | 0 | B | F | GW1 | A | 4 | 0 |

US 9,647,931 B2

SYSTEMS, AND METHODS FOR REROUTING ELECTRONIC COMMUNICATIONS

CROSS-REFERENCE TO RELATED APPLICATION

This application is based upon and claims the benefit of priority of the prior Japanese Patent Application No. 2013-233347, filed on Nov. 11, 2013, the entire contents of which are incorporated herein by reference.

FIELD

The embodiment discussed herein is related to a system, a method, and a medium.

BACKGROUND

In an ad-hoc network, node apparatuses spontaneously form a network. Since communication is spontaneously performed, a user does not set a communication route where appropriate and communication terminals for communication management, such as servers and routers, and infrastructures are not used.

Examples of a node apparatus which is connected to the ad-hoc network include a gateway apparatus (hereinafter referred to as a "GW" where appropriate). The gateway apparatus has a function of communicating with a server. As a related art, a technique of performing switching of a gateway function in an ad-hoc network system has been proposed (refer to Japanese Patent Laid-Open No. 2008-193318, for example).

SUMMARY

According to an aspect of the invention, a system includes first and second apparatuses configured to communicate with a server apparatus; and a third apparatus configured to transmit data to the first apparatus and record number of transfer of the data in the system, the data including information on a destination of the data and the number of transfer, wherein the first apparatus is configured to set the destination to the second apparatus and update the number of transfer, when receiving the data and not being allowed to communicate with the server apparatus, and transmit an updated data including information on the set destination and the updated number of transfer, to the third apparatus, and the third apparatus is configured to transmit the updated data to the second apparatus based on the set destination when the updated number of transfer is equal to or smaller than the recorded number of transfer when receiving the updated data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A is a diagram illustrating an example of a frame management table and FIG. 8B is a diagram illustrating an example of a frame format.

FIG. 14 is a diagram illustrating an example of a frame management table and a frame format of a fourth concrete example.

FIG. 16 is a diagram illustrating an example of a frame management table and a frame format of the fifth concrete example.

FIG. 18 is a diagram illustrating an example of a frame management table and a frame format of a sixth concrete example.

FIGS. 20A and 20B are diagrams illustrating examples of a frame management table and a frame format of the seventh concrete example.

DESCRIPTION OF EMBODIMENT

Figure 1:
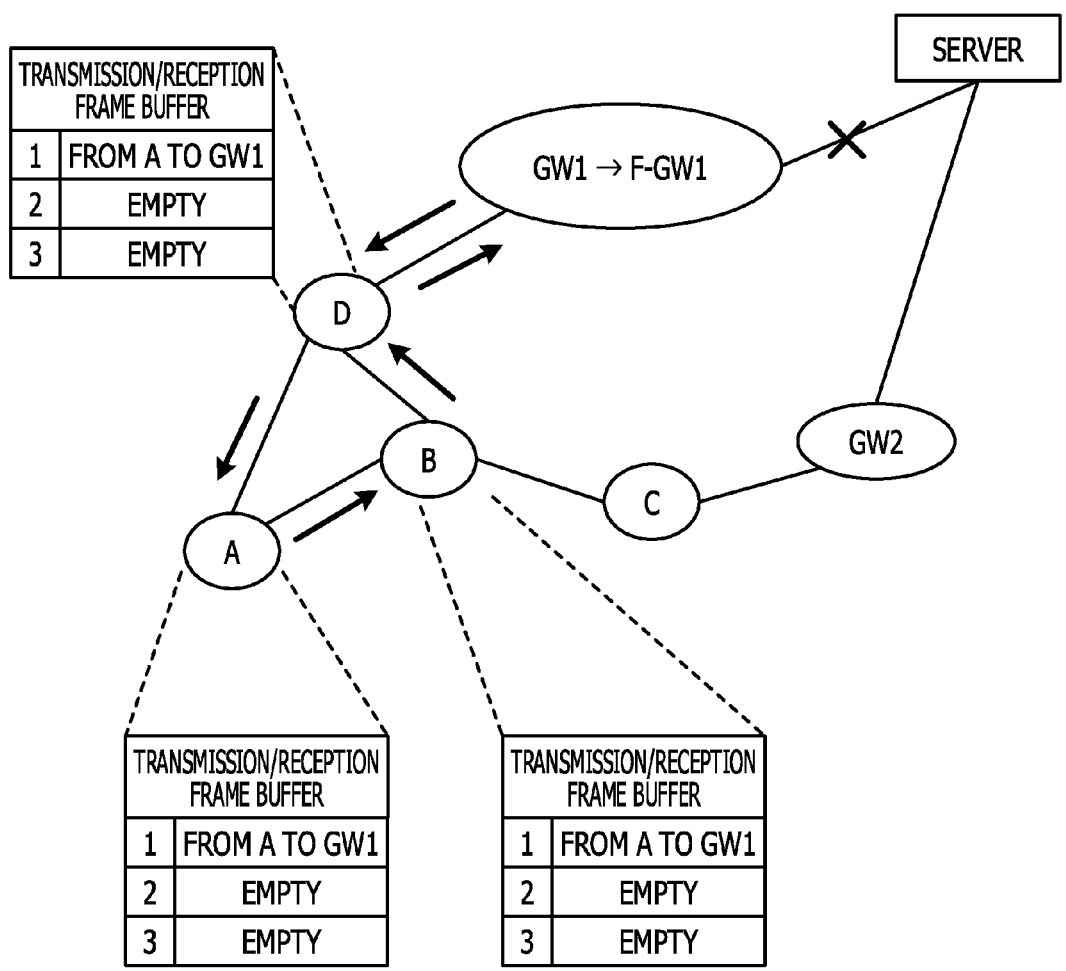
FIG. 1 is a diagram illustrating an example of communication performed when communication between a gateway apparatus and a server is unavailable.

First, discussion of inventers will be described. A gateway apparatus receives a frame transmitted from a node apparatus and transmits the received frame to a server. When communication between the gateway apparatus and the server is interrupted for some reason, the communication between the gateway apparatus and the server fails. In this case, the gateway apparatus may not transmit the frame supplied from the node apparatus to the server.

Therefore, an apparatus which is used to be a gateway apparatus (hereinafter referred to as a "former gateway apparatus" where appropriate) transmits data to another node apparatus. The frame is supplied to the server from another gateway apparatus via another route. In this case, it is likely that the frame is discarded.

A description will be made with reference to FIG. 1. An ad-hoc network of FIG. 1 includes node apparatuses A to D and gateway apparatuses GW1 and GW2. The communication between the gateway apparatus GW1 and the server fails, and therefore, the gateway apparatus GW1 becomes a former gateway apparatus F-GW1. The former gateway apparatus F-GW1 is not capable of communicating with the server.

Before recognizing transition from the gateway apparatus GW1 to the former gateway apparatus F-GW1, the node apparatus A transmits a frame to an address of the gateway apparatus GW1. The frame transmitted from the node apparatus A is transmitted to the former gateway apparatus F-GW1 through the node apparatuses B and D.

By this time, the gateway apparatus GW1 has been changed to the former gateway apparatus F-GW1. The former gateway apparatus F-GW1 is not capable of transmitting the frame to the server, and therefore, the former gateway apparatus F-GW1 transmits the frame to the node apparatus D so as to transmit the frame to the server through the gateway apparatus GW2.

The node apparatus D determines that a route loop has occurred when receiving the frame which has received before again. Therefore, the node apparatus D transmits the frame through a route to which the received frame has not been transmitted. Accordingly, the node apparatus D transmits the frame to the node apparatus A.

The node apparatus A receives the frame which has been transmitted by itself. Therefore, the node apparatus A determines that the route loop has occurred. The frame has been transmitted through the route from the node apparatus A to the node apparatus B and the route from the node apparatus A to the node apparatus D, that is, the frame is transmitted through all the routes. At this time, the node apparatus A discards the frame. Accordingly the frame to be transmitted to the server is lost.

To avoid the discarding of a frame, the former gateway apparatus F-GW1 may generate another frame to be transmitted. A description thereof will be made with reference to FIG. 2. The former gateway apparatus F-GW1 generates a frame (hereinafter referred to as a "second frame" where appropriate) which is different from the frame (hereinafter referred to as a "first frame" where appropriate) supplied from the node apparatus D.

Although the second frame has information the same as that of the first frame received by the former gateway apparatus F-GW1, the first and second frames are different from each other. The former gateway apparatus F-GW1 transmits the second frame to the node apparatus D. Since the first and second frames are different from each other, the node apparatus D does not perform discarding of the frame.

Figure 2:
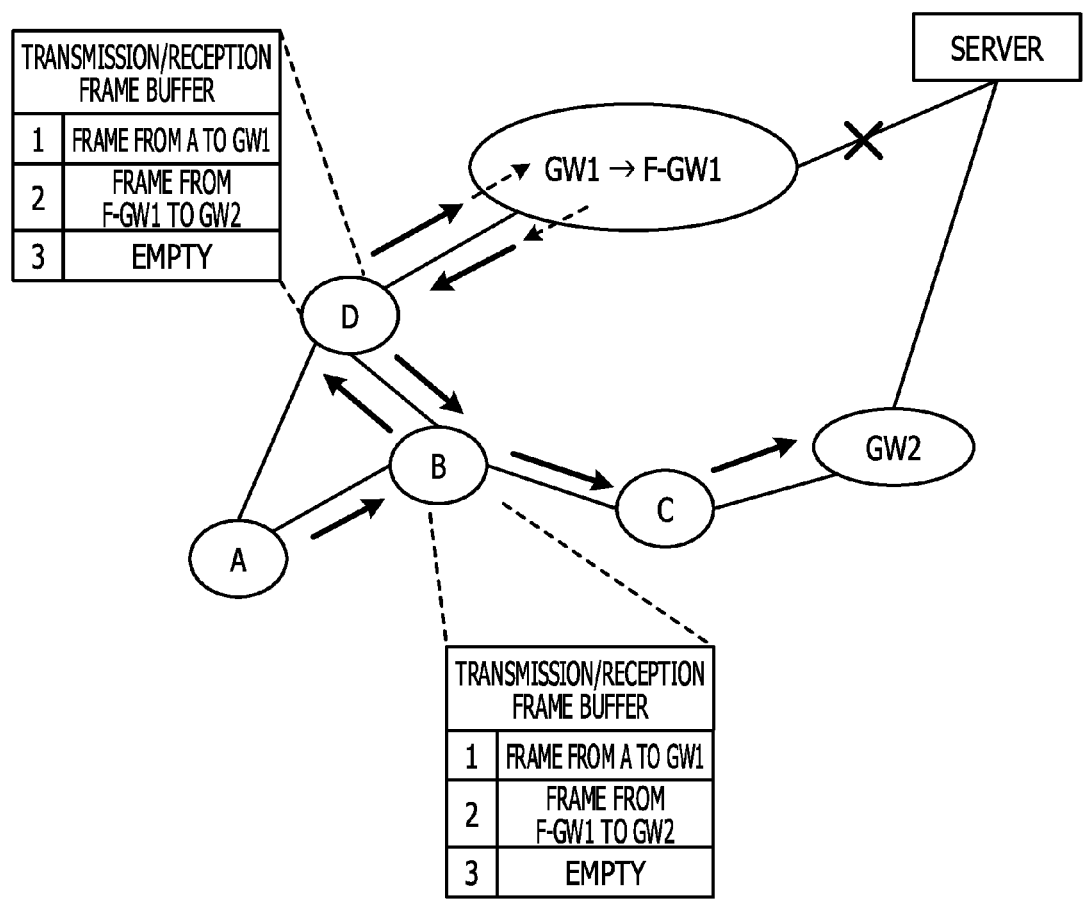
FIG. 2 is a diagram illustrating another example of communication performed when communication between the gateway apparatus and the server is unavailable.

When receiving the frame, the node apparatus D stores information on the frame in a transmission/reception buffer of itself for each frame. In FIG. 2, the node apparatuses B and D store the first and second frames in the respective transmission/reception buffers.

Accordingly, when compared with the case of FIG. 1, use amounts of the buffers are doubled. When a buffer is realized by a memory, a use amount of the memory is doubled. Therefore, a use amount of a hardware resource of a node apparatus increases.

According to an embodiment described below, even when communication between a gateway apparatus and a server is interrupted, a frame transmitted from a node apparatus may be transmitted to the server through another gate apparatus.

Ad-Hoc Network

Figure 3:
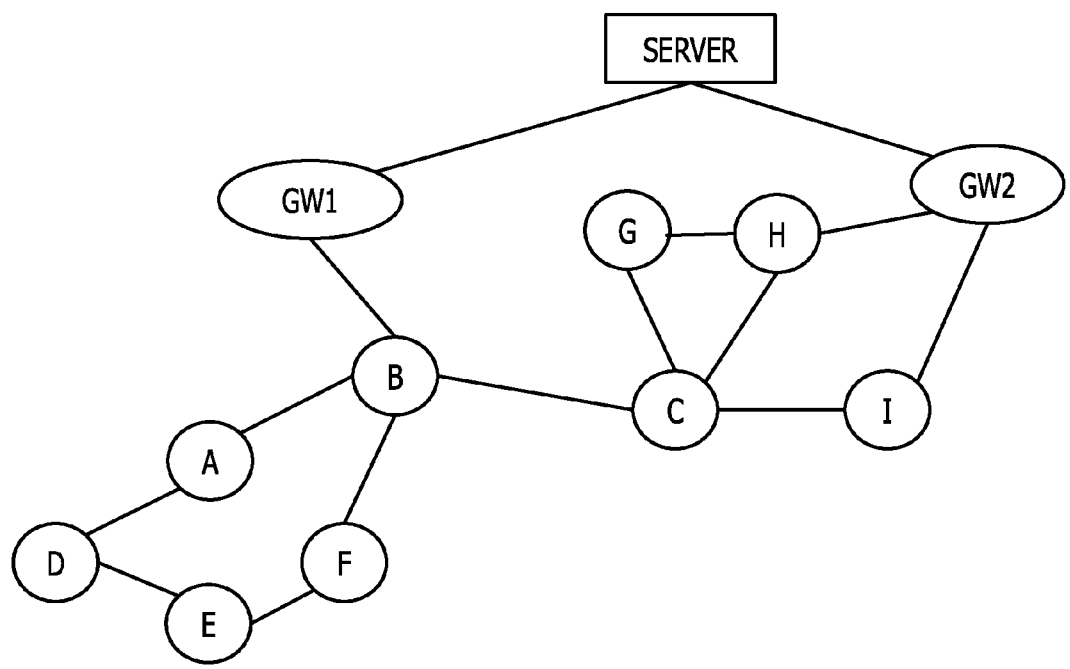
FIG. 3 is a diagram illustrating an example of an ad-hoc network according to an embodiment.

An example of an ad-hoc network will be described with reference to FIG. 3. As illustrated in FIG. 3, node apparatuses A to I and gateway apparatuses GW1 and GW2 are included in the ad-hoc network. Apparatuses included in the ad-hoc network are not limited to the examples of FIG. 3.

The gateway apparatuses GW1 and GW2 have a function of communicating with a server.

Smart meters may be used as the node apparatuses A to I, for example. The smart meters are measurement equipment which measures a use amount of water or the like and has a communication function. A measured value may be transmitted using the communication function. As a server, a server which collects information may be used, for example.

The gateway apparatuses GW1 and GW2 transmit a frame transmitted by the node apparatuses A to I to the gateway apparatus GW2 and the gateway apparatus GW1, respectively. The frame is an example of data transmitted by a node apparatus. The gateway apparatuses GW1 and GW2 transmit a received frame to the server.

Each of the node apparatuses A to I performs communication with adjacent node apparatuses. Furthermore, communication is also performed between the node apparatuses B and the gateway apparatus GW1 and between the node apparatuses H and I and the gateway apparatus GW2. Similarly, communication is also performed between the gateway apparatuses GW1 and GW2 and the server. The communication may be wireless communication or wired communication. In this embodiment, the communication between the apparatuses is performed by wireless communication.

As illustrated in FIG. 3, routes are constructed among the node apparatuses A to I and the gateway apparatuses GW1 and GW2. To construct the routes, a Hello frame is transmitted and received among the apparatuses. By transmitting and receiving the Hello frame, an appropriate route from one of the node apparatuses A to I to one of the gateway apparatuses GW1 and GW2 may be selected. A route in which a frame is transmitted fastest from one of the node apparatuses A to I to one of the gate apparatuses is an example of the appropriate route.

Figure 4:
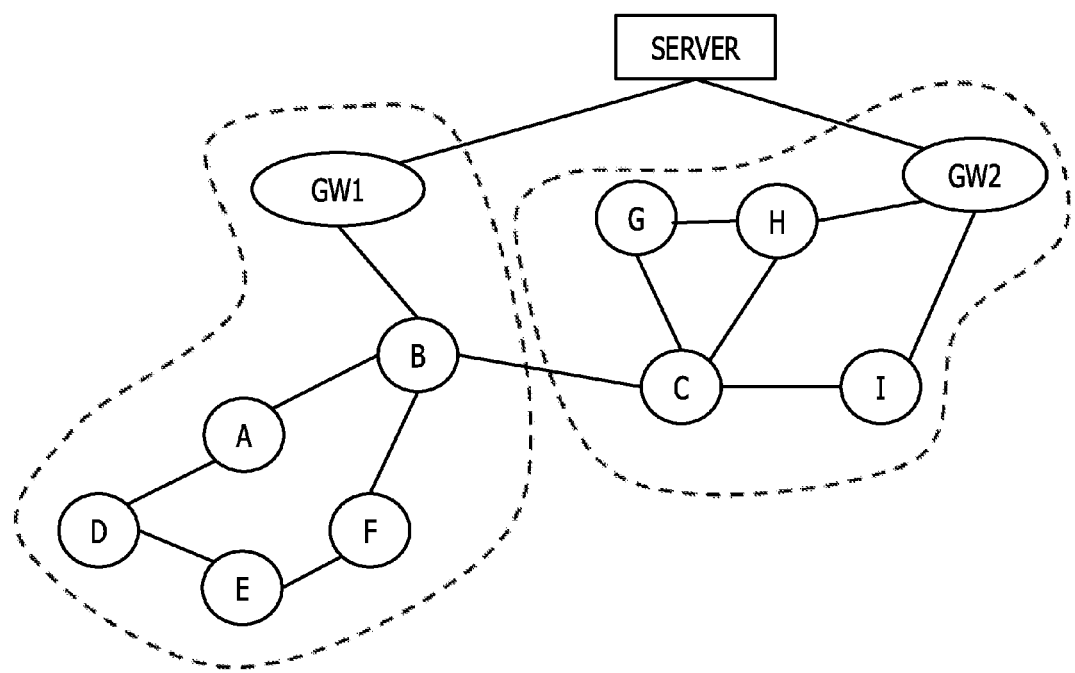
FIG. 4 is a diagram illustrating an example of gateway apparatus groups in the ad-hoc network of FIG. 3.

Referring to FIG. 4, the node apparatuses A, B, D, E, and F belong to a group of the gateway apparatus GW1. The node apparatuses A, B, D, E, and F transmit a frame to the gateway apparatus GW1 through adjacent apparatuses. The gateway apparatus GW1 transmits the received frame to the server.

The node apparatuses C, G, H, and I belong to a group of the gateway apparatus GW2. The node apparatuses C, G, H, and I transmit a frame to the gateway apparatus GW2 through adjacent apparatuses. The gateway apparatus GW2 transmits the frame to the server.

Figure 5:
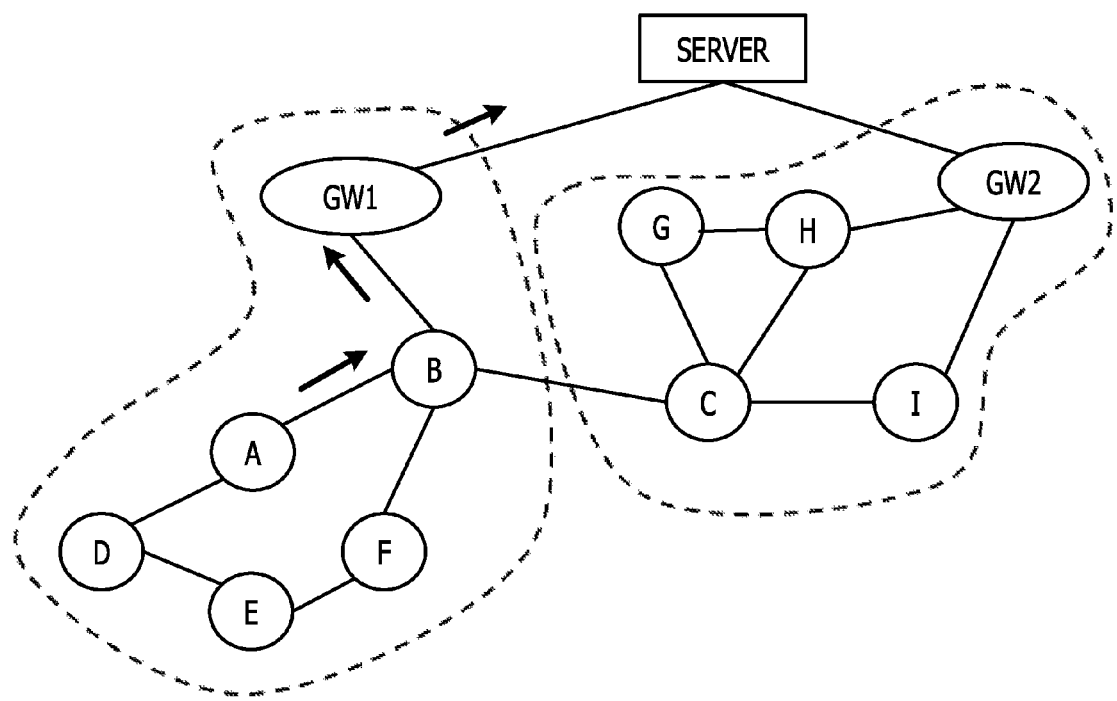
FIG. 5 is a diagram illustrating an example of communication through the ad-hoc network of FIG. 4.

FIG. 5 is a diagram illustrating a case where the node apparatus A transmits a frame. The node apparatus A generates a frame to be transmitted to the gateway apparatus GW1. The node apparatus A is not adjacent to the gateway apparatus GW1. Therefore, the node apparatus A transmits the frame to the node apparatus B which is adjacent to the node apparatus A.

The node apparatus B transmits the received frame to the gateway apparatus GW1. In this way, the frame generated by the node apparatus A is transmitted to the gateway apparatus GW1. The gateway apparatus GW1 transmits the received frame to the server. Accordingly, the server may receive the frame transmitted from the node apparatus A.

As described above, when a route of the ad-hoc network is constructed using the Hello frame, each of the node apparatuses A to I transmits a frame through an appropriate route. According to an example of FIG. 5, the node apparatus A appropriately transmits a frame to the gateway apparatus GW1 through the node apparatus B.

Case where Communication between Gateway Apparatus GW1 and Server is Interrupted The gateway apparatus GW1 transmits frames supplied from the node apparatuses A, B, D, E, and F to the server. Therefore, the gateway apparatus GW1 and the server normally communicate with each other.

Figure 6:
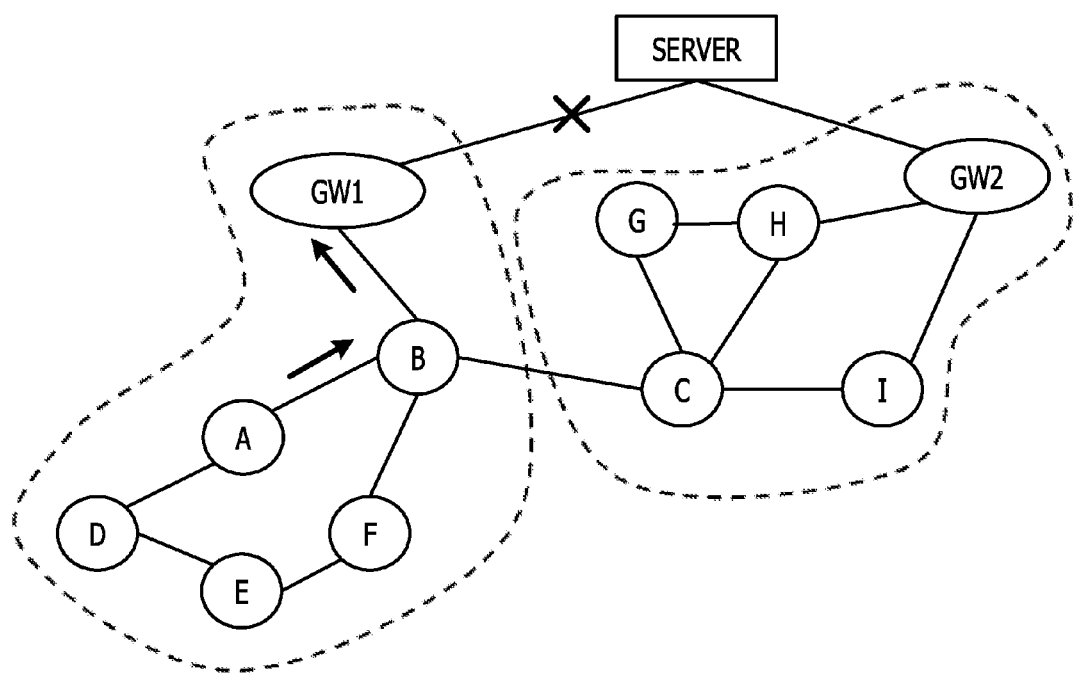
FIG. 6 is a diagram illustrating an example of communication performed when communication between the gateway apparatus and the server is unavailable.

Here, as illustrated in FIG. 6, it is assumed that communication between the gateway apparatus GW1 and the server is interrupted for some reason. In this case, the gateway apparatus GW1 may not transmit frames supplied from the node apparatuses A, B, D, E, and F to the server. Specifically, the gateway apparatus GW1 may not perform a function of transmitting a frame to the server.

Gateway apparatuses may function as node apparatuses even when the gateway apparatuses may not communicate with a server. A gateway apparatus which may not communicate with a server is referred to as a "former gateway apparatus". The former gateway apparatus may transmit a frame to other node apparatuses. The gateway apparatus GW1 which may not communicate with the server is referred to as a "former gateway apparatus F-GW1".

In this embodiment, the former gateway apparatus changes a destination of transmission of a frame to another gateway apparatus when receiving a frame addressed to the former gateway apparatus. By changing the destination of transmission of a frame to another gateway apparatus, the frame is transmitted to another gateway apparatus. Then the other gateway apparatus transmits the frame to the server.

The former gateway apparatus is an example of a first gateway apparatus. The other of the gateway apparatuses which is different from the first gateway apparatus is an example of a second gateway apparatus.

Configuration of Communication Apparatus

Figure 7:
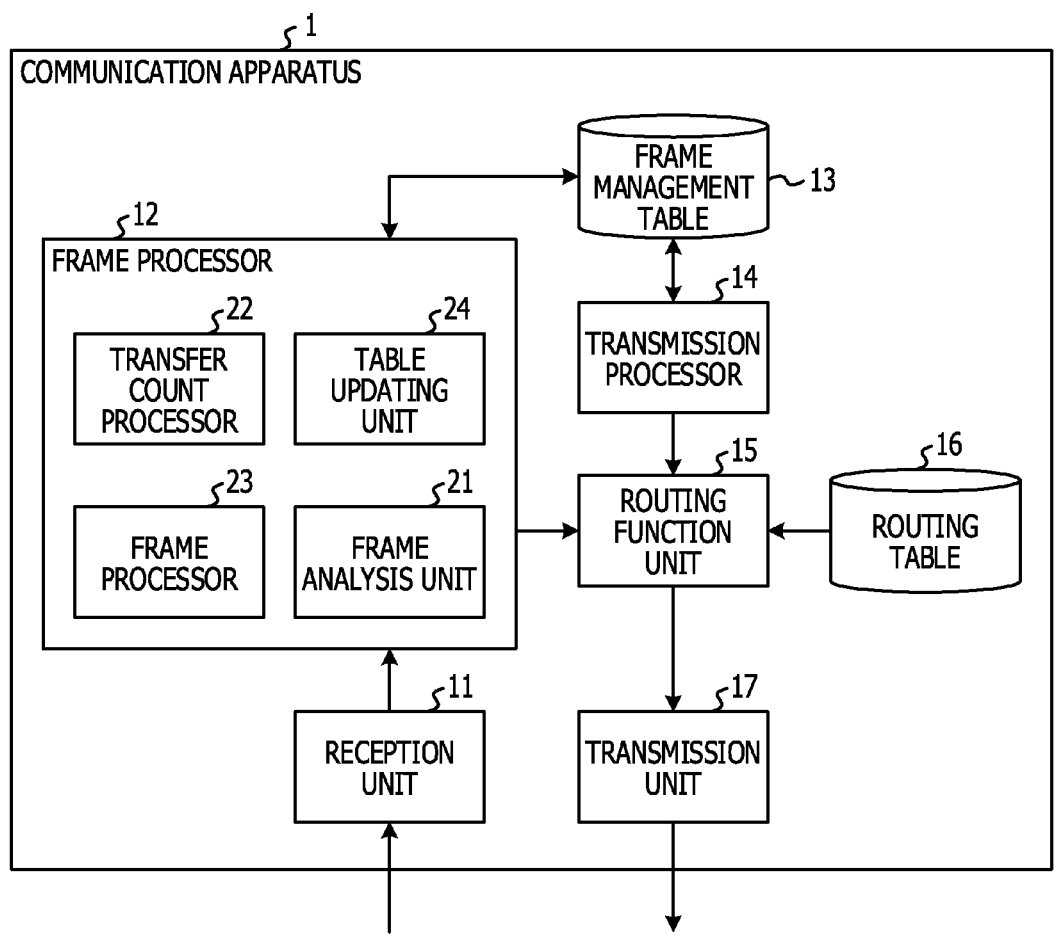
FIG. 7 is a diagram illustrating an example of functional blocks of a communication apparatus.

FIG. 7 is a diagram illustrating a communication apparatus 1 of this embodiment. The communication apparatus 1 includes a reception unit 11, a reception processor 12, a frame management table 13, a transmission processor 14, a routing function unit 15, a routing table 16, and a transmission unit 17. A node apparatus is an example of a communication apparatus. Furthermore, a gateway apparatus and a former gateway apparatus may be used as a node apparatus.

The reception unit 11 receives a frame transmitted from another communication apparatus 1. The reception unit 11 outputs the received frame to the reception processor 12. The reception processor 12 performs a predetermined process on the received frame. Furthermore, the reception processor 12 outputs the received frame to the routing function unit 15. The reception processor 12 includes a frame analysis unit 21, a transfer count processor 22, a frame processor 23, and a table updating unit 24.

The frame management table 13 manages information on the received frame. FIG. 8A is a diagram illustrating the frame management table 13. The frame management table 13 includes three items, that is, Global Source (GS), Frame ID (FID), and a transfer count. The frame management table 13 is an example of a management unit.

GS represents a global transmission source address. The global transmission source address represents an address of a node apparatus which generates a frame and transmits the generated frame. FID represents a frame identifier. The frame identifier is information for distinguishing a corresponding frame from other frames. Accordingly, each frame has a unique frame identifier. The transfer count represents the number of times a frame is transferred. The transfer count will be described hereinafter.

The frame management table 13 stores entries each of which has GS, FID, and the transfer count. The entries are stored in the frame management table 13 for each pair of the FID and the GS. Items stored in one entry are not limited to the three items, that is, GS, FID, and the transfer count, and other items may be stored.

Information on the entries included in the frame management table 13 may be obtained from frames received by the reception unit 11. FIG. 8B is a diagram illustrating a frame format. Note that the frame format is not limited to six items of FIG. 8B.

Global Destination (GD) represents a global destination address. The global destination address represents an address of a destination of a frame. That is, GD represents a destination of a frame. In general, GD represents an address of the gateway apparatus GW1 or the gateway apparatus GW2.

Local Destination (LD) represents a local destination address. The local destination address represents a next transmission destination of a frame. LD represents an address of a communication apparatus located adjacent to a corresponding communication apparatus 1. LS represents a local transmission source address. The local transmission source address represents an address of a corresponding communication apparatus 1.

The transmission processor 14 generates a frame in accordance with data which is requested by a higher-level functional block to be transmitted. The higher-level functional block may correspond to a section which controls the communication apparatus 1. When the transmission processor 14 generates a frame, GS included in the flam represents the communication apparatus 1 including the transmission processor 14. The transmission processor 14 registers the generated frame in the frame management table 13. The transmission processor 14 is an example of a third processor.

The routing function unit 15 receives a frame from the reception processor 12 or the transmission processor 14. The routing function unit 15 sets LD to the frame with reference to the routing table 16. The routing table 16 stores LDs in an appropriate route from the communication apparatus 1 including the routing table 16 to GD.

The routing function unit 15 determines next LD with reference to the routing table 16. Furthermore, LS corresponds to the communication apparatus 1 including the routing function unit 15. The routing function unit 15 sets LD and LS to the frame generated by the transmission processor 14 and outputs the frame to the transmission unit 17.

The transmission unit 17 transmits the frame supplied from the routing function unit 15. In this case, the transmission unit 17 transmits the frame to a communication apparatus represented by LD with reference to LD of the frame.

Next, the components included in the reception processor 12 will be described. The frame analysis unit 21 analyzes information on a frame received by the reception unit 11. The transfer count processor 22 performs a predetermined process on the frame under a certain condition. The transfer count processor 22 is an example of a first processor.

The frame processor 23 performs a predetermined process on the frame. The frame processor 23 is an example of a second processor. The table updating unit 24 updates the frame management table 13 in accordance with the frame received by the reception unit 11. The table updating unit 24 is an example of an updating unit.

Process of Communication Apparatus

Figure 9:
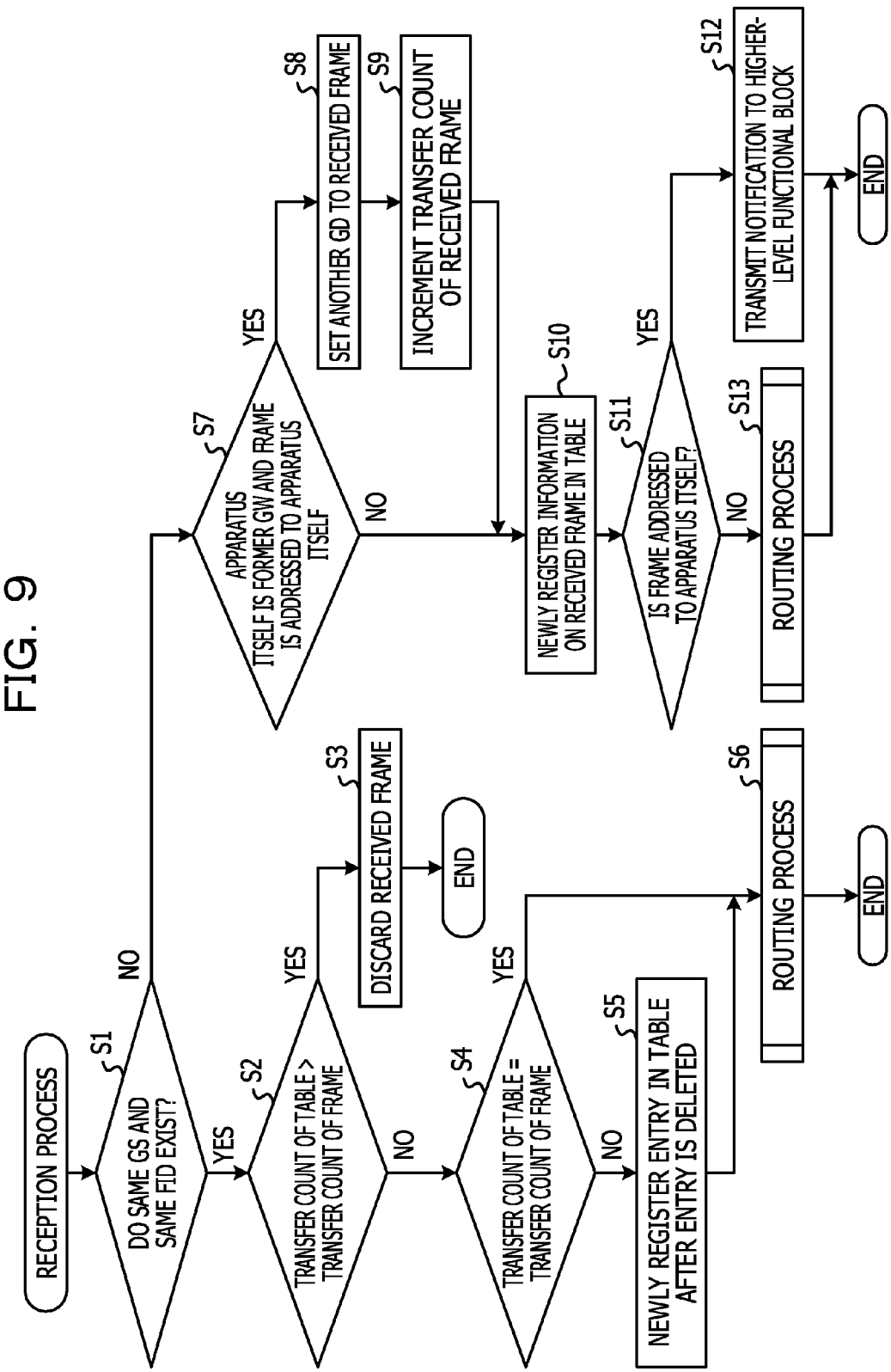
FIG. 9 is a flowchart illustrating an example of a reception process of the communication apparatus.

Next, a process performed by the communication apparatus 1 will be described. FIG. 9 is a flowchart illustrating an example of a reception process performed by the communication apparatus 1. The reception unit 11 receives a frame from another communication apparatus which is adjacent to the communication apparatus including the reception unit 11. The reception unit 11 outputs the received frame to the reception processor 12.

The frame analysis unit 21 analyzes the received frame. The frame analysis unit 21 extracts GS and FID from the received frame. The frame processor 23 determines whether an entry corresponding to GS and FID of the received frame is included in the frame management table 13 (step S1).

When the frame management table 13 includes the entry corresponding to GS and FID of the received frame (YES in step S1), the frame processor 23 obtains a transfer count of the entry from the frame management table 13. Hereinafter, the transfer count of the entry is referred to as a transfer count of the frame management table 13 where appropriate.

Next, the frame processor 23 compares the transfer count of the received frame with the transfer count of the frame management table 13 so as to determine whether the transfer count of the frame management table 13 is larger than the transfer count of the frame (step S2).

When the transfer count of the frame management table 13 is larger than the transfer count of the received frame (YES in step S2), the frame processor 23 discards the received frame (step S3). Then the communication apparatus 1 terminates the reception process.

On the other hand, when the transfer count of the frame management table 13 is equal to or smaller than the transfer count of the received frame (NO in step S2), the frame processor 23 does not discard the received frame. Subsequently, the frame processor 23 determines whether the transfer count of the entry in the frame management table 13 is equal to the transfer count of the received frame (step S4). When the determination is negative (NO in step S4), the table updating unit 24 deletes the entry in the frame management table 13.

Then the table updating unit 24 newly registers information on the received frame in the frame management table 13 (step S5). Here, the table updating unit 24 registers GS, FID, and the transfer count of the received frame to the entry represented by FID in the frame management table 13. Specifically, the table updating unit 24 updates the entry in the frame management table 13.

When the determination is negative in step S4, a routing process is performed (step S6) after a process in step S5 is performed. Furthermore, also when it is determined that the transfer count of the entry in the frame management table 13 is equal to the transfer count of the received frame (YES in step S4), the routing process is performed (step S6). In this case, a special process is not performed before the routing process is performed. By performing the routing process, the frame received by the communication apparatus 1 may be transmitted to a next communication apparatus. Then the reception process is terminated.

Next, a process performed when the determination is negative in step S1 will be described. In this case, an entry corresponding to GS and FID of the received frame is not included in the frame management table 13. At least the communication apparatus 1 has not received the frame identified by FID.

The frame processor 23 determines whether the communication apparatus 1 including the frame processor 23 is a former gateway apparatus and the received frame is addressed to the communication apparatus 1 of the frame processor 23 (step S7). When the communication apparatus 1 of the frame processor 23 is a former gateway apparatus and the received frame is addressed to the communication apparatus 1 of the frame processor 23 (YES in step S7), the frame processor 23 changes GD of the received frame.

Specifically, the frame processor 23 sets another gateway apparatus to GD of the frame (step S8). In this embodiment, the frame processor 23 sets the gateway apparatus GW2 to GD of the frame.

The transfer count processor 22 increments the transfer count of the received frame (step S9). On the other hand, when the communication apparatus 1 of the frame processor 23 is not a former gateway apparatus or when the received frame is not addressed to the communication apparatus 1 of the frame processor 23, the process in step S8 and step S9 is not performed.

The table updating unit 24 newly registers information on the received frame in the frame management table 13 (step S10). The process in step S10 is performed when the determination is negative in step S1. Specifically, the process in step S10 is performed when an entry corresponding to GS and FID of the received frame is not included in the frame management table 13.

Accordingly, the table updating unit 24 newly registers information on the received frame in the frame management table 13. In this embodiment, the table updating unit 24 registers three items, that is, GS, FID, and the transfer count, in the frame management table 13.

The frame processor 23 determines whether the received frame is addressed to the communication apparatus 1 of the frame processor 23 (step S11). When the received frame is addressed to the communication apparatus 1 of the reception processor 12, the reception processor 12 notifies the higher-level functional block of the fact that the received frame is addressed to the communication apparatus 1 of the reception processor 12.

On the other hand, when the received frame is not addressed to the communication apparatus 1 of the reception processor 12, the frame is to be transmitted to a next communication apparatus. In this case, a routing process the same as that performed in step S6 is performed (step S13).

Figure 10:
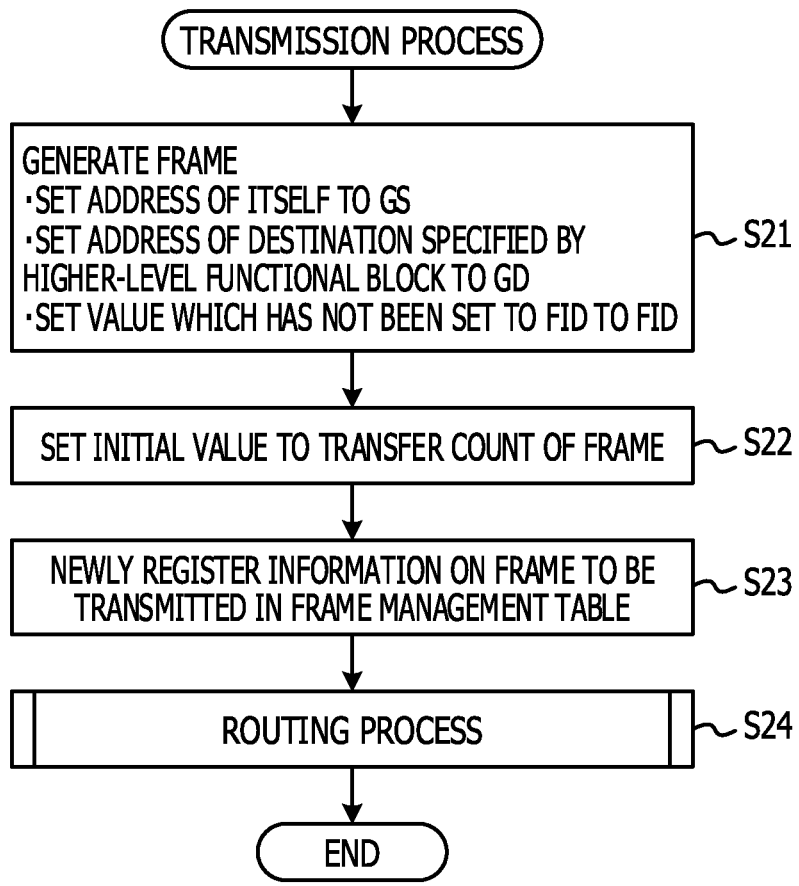
FIG. 10 is a flowchart illustrating an example of a transmission process of the communication apparatus.

Next, a transmission process in which the communication apparatus 1 generates a frame and transmits the generated frame will be described with reference to FIG. 10. When the communication apparatus 1 transmits information to the server, the transmission processor 14 generates a frame (step S21).

When the transmission processor 14 generates a frame, an address of the communication apparatus 1 is set to GS of the frame. Furthermore, the transmission processor 14 sets a destination address specified by the higher-level functional block to GD of the frame. Specifically, the transmission processor 14 sets an address of a final destination to GD of the frame.

The transmission processor 14 sets a value which has not been set to FID of the frame to FID of the frame. Since FID is an identifier for identifying the frame, the FID has a unique value. Therefore, the transmission processor 14 sets a value which has not been set to FID of the frame to FID of the frame.

The transmission processor 14 sets an initial value to a transfer count of the frame (step S22). Although the initial value is basically "0", a value other than "0" may be set. The transmission processor 14 newly registers information on the frame to be transmitted in the frame management table 13 (step S23).

The routing function unit 15 performs a routing process on the generated frame (step S24). The routing process is the same as that performed in step S6 and step S13 of FIG. 9. When the routing function unit 15 performs the routing process, LD is set to the frame. The transmission unit 17 transmits the frame to which the various values are set to LD. In this way, the transmission process is terminated.

First Concrete Example

Figure 11A:
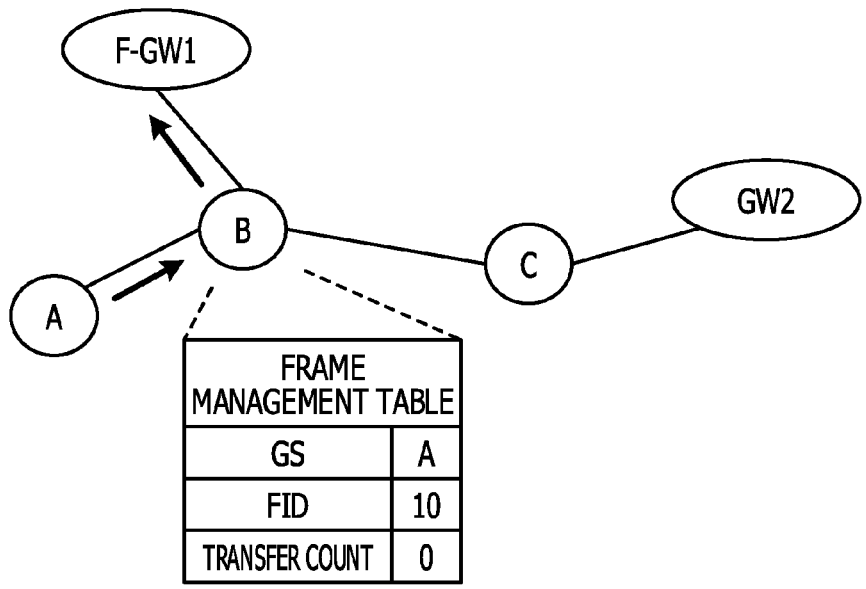
FIGS. 11A and 11B are diagrams illustrating a first concrete example.
Figure 11B:
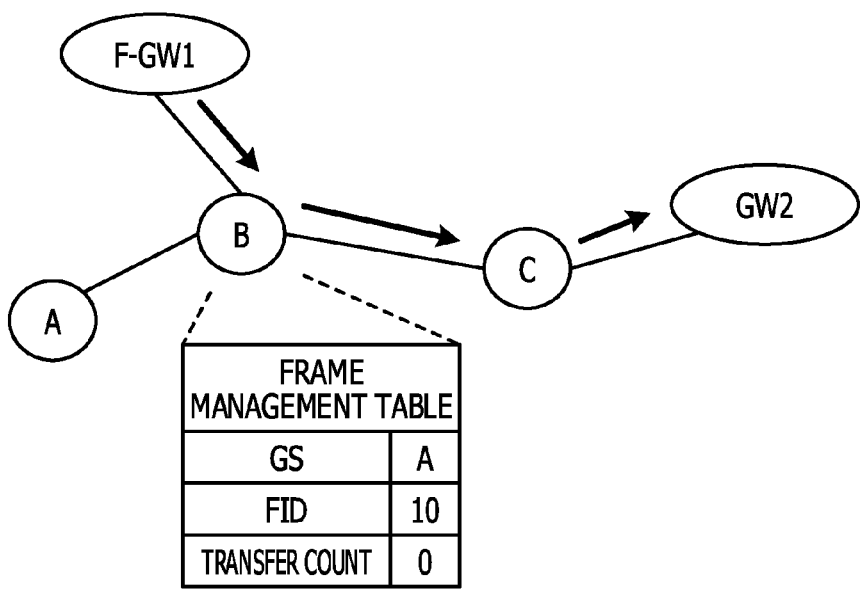

A first concrete example will now be described with reference to FIGS. 11A and 11B. In FIGS. 11A and 11B, node apparatuses A to C and gateway apparatuses GW1 and GW2 are included in an ad-hoc network. However, communication between the gateway apparatus GW1 and a server fails, and therefore, the gateway apparatus GW1 becomes a former gateway apparatus F-GW1. The apparatuses included in the ad-hoc network are examples of the communication apparatus 1.

A transmission processor 14 of the node apparatus A newly generates a frame. GS of the frame represents an address of the node apparatus A. The two gateway apparatuses, that is, the gateway apparatuses GW1 and GW2, are candidates of GD of the frame. A higher-level functional block of the node apparatus A determines GD. For example, the higher-level functional block of the node apparatus A determines the gateway apparatus GW1 as GD. Furthermore, a frame processor 23 sets "10" to FID of the frame, for example.

It is assumed that communication between the gateway apparatus GW1 and the server is interrupted after the node apparatus A transmits the frame. Therefore, the gateway apparatus GW1 may not communicate with the server and may not transmit frames supplied from the node apparatuses A to C.

Accordingly, the gateway apparatus GW1 is changed to a former gateway apparatus F-GW1. The former gateway apparatus F-GW1 may not communicate with the server but may perform communication of the frame with the node apparatus B. The former gateway apparatus F-GW1 may be a node apparatus.

The frame transmitted by the node apparatus A is received by the node apparatus B. A table updating unit 24 of the node apparatus B stores information on the received frame in a frame management table 13. The frame received by the node apparatus B has GS of "A". Furthermore, FID is "10". A transfer count is "0" which is an initial value. Accordingly, information illustrated in FIG. 11A is stored in the frame management table 13.

The node apparatus B is adjacent to the former gateway apparatus F-GW1. Then GD of the frame is an address of the gateway apparatus GW1. Accordingly, the node apparatus B transmits the frame to the former gateway apparatus F-GW1. The former gateway apparatus F-GW1 receives the frame transmitted by the node apparatus B.

The former gateway apparatus F-GW1 may not transmit the frame to the server. Therefore, the former gateway apparatus F-GW1 changes GD of the frame to the gateway apparatus GW2. Since the former gateway apparatus F-GW1 was the gateway apparatus GW1, a frame management table 13 does not include an entry corresponding to GS and FID of the received frame.

Accordingly, the determination is negative in step S1 of FIG. 9. Since the former gateway apparatus F-GW1 itself is a former gateway apparatus and GD of the frame represents the former gateway apparatus F-GW1 itself, the determination is affirmative in step S7. Accordingly, in step S8 of FIG. 9, the former gateway apparatus F-GW1 changes GD of the frame.

By this, a destination of the frame is changed. Specifically, although a destination of the frame generated by the node apparatus A was the gateway apparatus GW1, the address of the frame is changed by the former gateway apparatus F-GW1 to another gateway apparatus.

In this embodiment, a frame processor 23 of the former gateway apparatus F-GW1 changes the destination of the frame to the gateway apparatus GW2. Specifically, when the gateway apparatus GW1 is changed to the former gateway apparatus F-GW1, the former gateway apparatus F-GW1 changes the destination of the frame.

Examples of the reason that the gateway apparatus GW1 is changed to the former gateway apparatus F-GW1 include a case where communication from the gateway apparatus GW1 to the server becomes unavailable. Furthermore, when the gateway apparatus GW1 simply functions as a node apparatus, the gateway apparatus GW1 is changed to the former gateway apparatus F-GW1.

A transfer count processor 22 of the former gateway apparatus F-GW1 increments the transfer count of the frame in step S9. When the transfer count of the frame is incremented, the transfer count of the frame becomes "1" from "0" which is the initial value. Specifically, when the former gateway apparatus F-GW1 changes the destination of the frame, the transfer count of the frame is incremented.

The former gateway apparatus F-GW1 transfers the frame to the node apparatus B with reference to a routing table 16.

As illustrated in FIG. 11A, in the frame management table 13 of the node apparatus B, the transfer count of the entry corresponding to FID of "10" is "0". On the other hand, the transfer count of the frame is "1". Since the transfer count of the frame is larger than the transfer count of the entry of the frame management table 13, the determination is negative in step S2 of FIG. 9.

Accordingly, since the determination in step S2 of FIG. 9 is not affirmative, the frame is not discarded. The transfer count of the frame and the transfer count of the entry of the frame management table 13 are not equal to each other. Therefore, the determination is also negative in step S4.

Accordingly, the table updating unit 24 of the node apparatus B deletes the entry having FID of "10" in the frame management table 13 and newly registers an entry having FID of "10" in accordance with information on the received frame. Specifically, the table updating unit 24 updates the frame management table 13. Here, GS is "A" and FID is "10". The transfer count has been changed to "1". Accordingly, the frame management table 13 illustrated in FIG. 11B is obtained.

A routing table 16 of the node apparatus B represents that LD is the node apparatus C, for example. Therefore, the frame is transmitted to the node apparatus C. Then the node apparatus C transmits the frame to the gateway apparatus GW2 located adjacent to the node apparatus C. Then the frame is transmitted from the gateway apparatus GW2 to the server.

Accordingly, even when the gateway apparatus GW1 may not communicate with the server, the frame is not discarded. Since the frame transmitted form the node apparatus A is transferred from the former gateway apparatus F-GW1 to the gateway apparatus GW2, the frame may be transmitted to the server.

Furthermore, the node apparatus B performs comparison of the transfer count of the frame, deletes the entry of the frame management table 13, and newly registers information on the received frame. Therefore, an amount of information stored in the frame management table 13 is not increased. Consequently, a use amount of hardware may be suppressed.

Second Concrete Example

A second concrete example will now be described with reference to FIGS. 12A and 12B. A node apparatus A generates a frame. It is assumed that GD of the generated frame is a gateway apparatus GW1 and FID is "10". Since the node apparatus A generates the frame, the initial value is "0".

It is assumed that, at this point, the node apparatus A recognizes that the gateway apparatus GW1 may communicate with a server. Thereafter, the communication between the gateway apparatus GW1 and the server becomes not available and the gateway apparatus GW1 becomes a former gateway apparatus F-GW1.

Figure 12A:
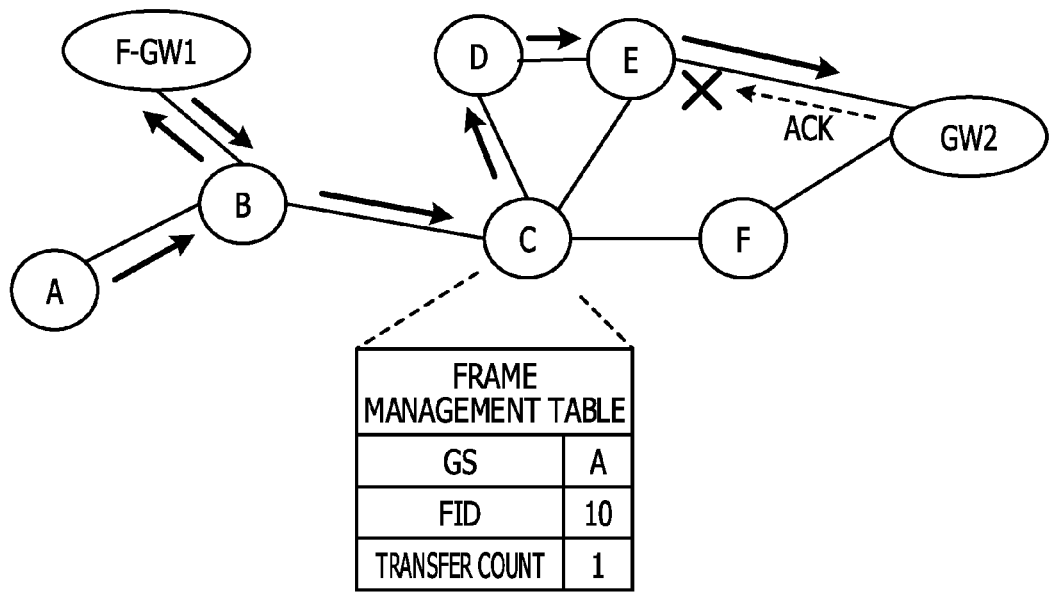
FIGS. 12A and 12B are diagrams illustrating a second concrete example.

As illustrated in FIG. 12A, the node apparatus A transmits the frame to a node apparatus B. The node apparatus B stores information in a frame management table 13 and transmits the frame to an address of the former gateway apparatus F-GW1. By this time, the gateway apparatus GW1 may not communicate with the server and the gateway apparatus GW1 is changed to the former gateway apparatus F-GW1.

Therefore, the former gateway apparatus F-GW1 changes GD of the received frame to a gateway apparatus GW2. By this, the frame is transferred from the former gateway apparatus F-GW1 to the gateway apparatus GW2. Then a transfer count of the frame is incremented to "1".

The node apparatus B receives the frame transmitted from the former gateway apparatus F-GW1. As illustrated in the first concrete example, an entry having FID of "10" in the frame management table 13 of the node apparatus B has a transfer count of "0". On the other hand, the transfer count of the frame is "1". Accordingly, since the determination in step S2 of FIG. 9 is negative, the frame is not discarded.

The node apparatus B transmits the frame to a node apparatus C. A table updating unit 24 of the node apparatus C stores GS, FID, and the transfer count of the received frame in a frame management table 13. Accordingly, the frame management table 13 of the node apparatus C illustrated in FIG. 12A is obtained.

According to a routing table 16 of the node apparatus C, LD is a node apparatus D. Specifically, it is recognized that the node apparatus C appropriately transmits the frame to a node apparatus D. Accordingly, the node apparatus C transmits the frame to the node apparatus D.

The node apparatus D receiving the frame stores information on the frame in a frame management table 13. Then the node apparatus D transmits the frame to a node apparatus E. The node apparatus E stores information on the frame in a frame management table 13. Then the node apparatus E transmits the frame to the gateway apparatus GW2 located adjacent to the node apparatus E.

Here, when the frame transmitted by the node apparatus E is normally received by the gateway apparatus GW2, the gateway apparatus GW2 transmits a notification (Acknowledgement: Ack) representing that normal communication is performed to the node apparatus E. When receiving Ack, the node apparatus E recognizes that the frame has normally been transmitted. In FIGS. 12A and 12B, solid arrows denote a state in which the frame is transmitted and dotted arrows denote a state in which Ack is transmitted. Arrows in FIGS. 13A and 13B denote the same states.

On the other hand, when the node apparatus E does not receives Ack, the node apparatus E recognizes that the frame has not been normally transmitted. In this case, the node apparatus E transmits the frame again. However, since the node apparatus E has not received Ack from the gateway apparatus GW2, the node apparatus E changes a transmission destination of the frame.

Figure 12B:
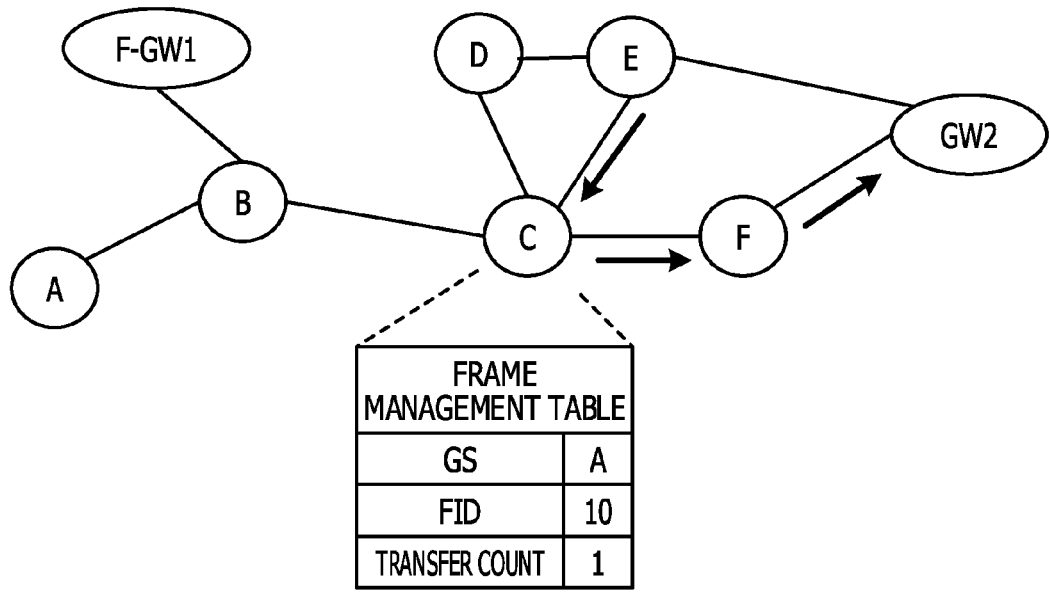

As illustrated in FIG. 12B, the node apparatus E transmits the frame to the node apparatus C which has not been selected as a route. Accordingly, the node apparatus C receives the frame again. Here, the transfer count of the frame management table 13 of the node apparatus C is "1". Similarly, the transfer count of the frame received by the node apparatus C is "1".

Accordingly, since the determination in step S2 of FIG. 9 is negative, the frame is not discarded. Furthermore, since the determination in step S4 of FIG. 9 is affirmative, the process in step S5 is not performed.

Consequently, as illustrated in FIG. 12B, the node apparatus C transmits the frame to a node apparatus F. The node apparatus F transmits the frame to the gateway apparatus GW2 located adjacent to the node apparatus F. Then the gateway apparatus GW2 may transmit the frame to the server.

In the second concrete example, the node apparatus E changes a transmission path of the frame since Ack is not returned. The node apparatus C does not discard the frame but performs a normal routing since the transfer count of the entry of the frame management table 13 is equal to the transfer count of the received frame when the determination of the transfer counts is performed. By this, the frame generated by the node apparatus A may be transmitted to the server.

Third Concrete Example

A third concrete example will now be described with reference to FIGS. 13A and 13B. A node apparatus A generates a frame. GS of the frame is "A", FID is "10", and a transfer count is "0" which is an initial value. Furthermore, since the node apparatus A does not recognize that communication between a gateway apparatus GW1 and a server is interrupted, the node apparatus A sets the gateway apparatus GW1 as GD of the frame.

The node apparatus A selects a node apparatus B as an appropriate route to the gateway apparatus GW1. Therefore, the node apparatus A transmits the frame to the node apparatus B. It is assumed that the node apparatus B receives the frame but the node apparatus A does not receive Ack.

The node apparatus B stores information on the frame in a frame management table 13 and transmits the frame to a former gateway apparatus F-GW1. By this time, the gateway apparatus GW1 becomes the former gateway apparatus F-GW1 since communication between the gateway apparatus GW1 and the server is interrupted.

The former gateway apparatus F-GW1 increments the transfer count and transfers the frame to the node apparatus B. The frame management table 13 of the node apparatus B has stored information on an entry having FID of "10". A transfer count of the entry is "0".

On the other hand, a transfer count of the frame supplied from the former gateway apparatus F-GW1 to the node apparatus B is "1". Accordingly, since the determination in step S2 of FIG. 9 is negative, the frame is not discarded. Similarly the determination in step S4 of FIG. 9 is also negative, and therefore, a table updating unit 24 of the node apparatus B deletes the entry having FID of "10" and newly stores information in accordance with the received frame.

Figure 13A:
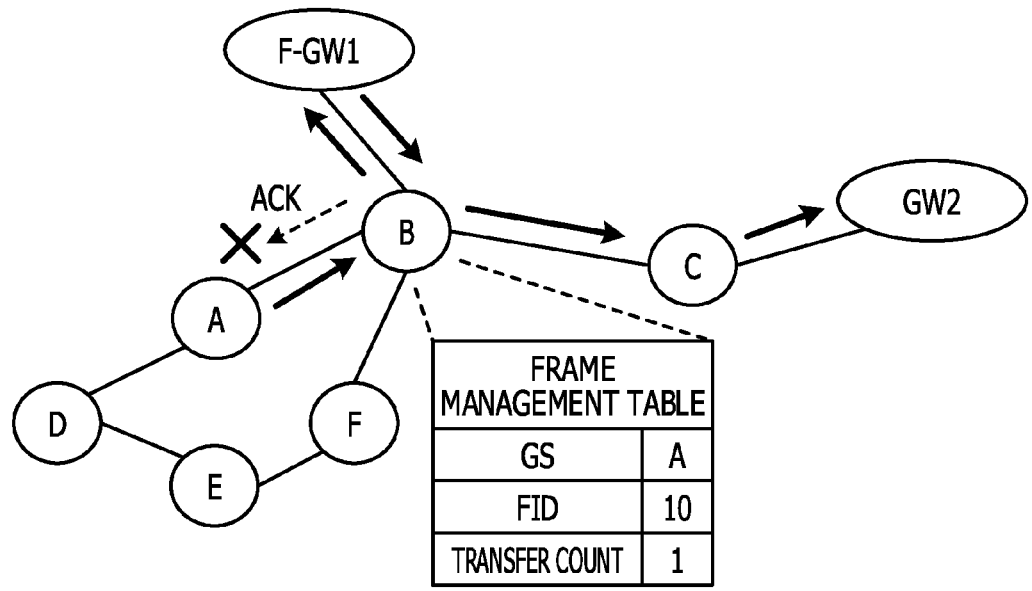
FIGS. 13A and 13B are diagrams illustrating a third concrete example.
Figure 13B:
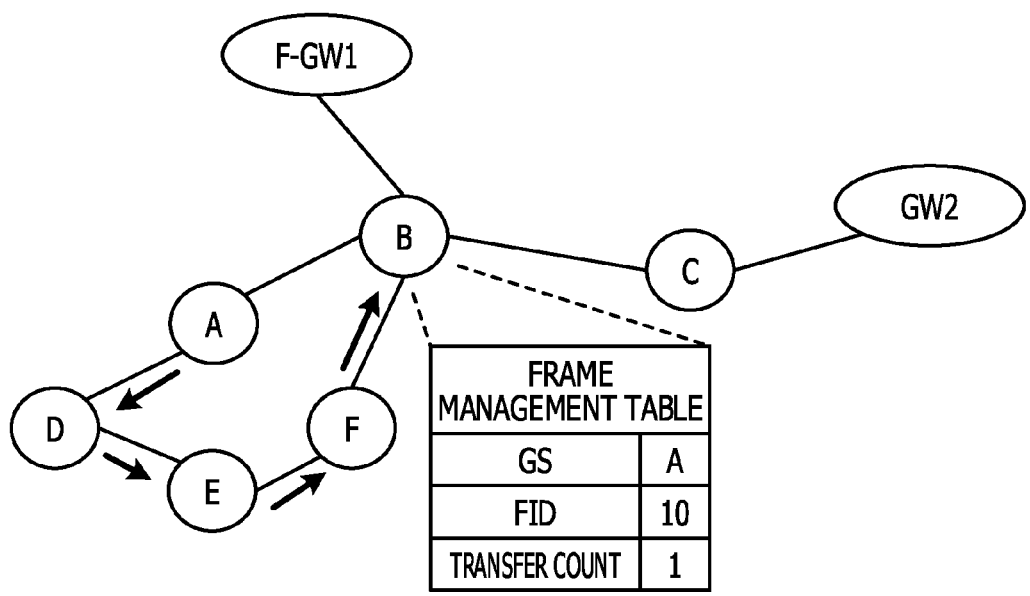

Since the transfer count of the received frame is "1", as illustrated in FIG. 13A, a transfer count of the entry having FID of "10" in the frame management table 13 of the node apparatus B is "1".

The node apparatus B transmits the frame to a node apparatus C. Then the node apparatus C transmits the frame to a gateway apparatus GW2 located adjacent to the node apparatus C. The gateway apparatus GW2 transmits the frame to the server. By this, the frame generated by the node apparatus A is transmitted to the server.

As described above, the node apparatus A has not received Ack corresponding to the frame transmitted to the node apparatus B. When not receiving Ack, the node apparatus A transmits the frame again. Note that the node apparatus A transmits the frame again only in a case where the node apparatus A does not receive Ack when a predetermined period of time has passed after the frame is transmitted.

The node apparatus A has not received Ack from the node apparatus B, and therefore, the node apparatus A transmits the frame to a node apparatus D instead of the node apparatus B. The frame transmitted again to the node apparatus D has values of GS, FID, and a transfer count which are the same as the frame transmitted from the node apparatus A to the node apparatus B. Specifically, GS is "A", FID is "10", and the transfer counter is "0" which is an initial value.

The node apparatus D stores information on the received frame in a frame management table 13 and transmits the frame to a node apparatus E. The node apparatus E stores information on the frame in a frame management table 13 and transmits the frame to a node apparatus F. The node apparatus F stores information on the frame in a frame management table 13 and transmits the frame to the node apparatus B.

The transfer count of the frame transmitted from the node apparatus F to the node apparatus B is "0". On the other hand, as illustrated in FIG. 13B, "1" has been stored in an entry having FID of "10" in the frame management table 13 of the node apparatus B.

In the determination in step S2 of FIG. 9, the node apparatus B compares the transfer count of the entry included in the frame management table 13 with the transfer count of the received frame. The transfer count in the frame management table 13 is "1" and the transfer count of the received frame is "0". Therefore, the determination is affirmative in step S2 of FIG. 9. Accordingly, the received frame is discarded.

However, as described above, the frame generated by the node apparatus A is transmitted from the gateway apparatus GW2 to the server. Therefore, even when the node apparatus B discards the frame supplied from the node apparatus F, the frame generated by the node apparatus A is transmitted to the server.

The frame supplied from the node apparatus F to the node apparatus B is to be discarded. The frame generated by the node apparatus A has been transmitted to the gateway apparatus GW2 through the node apparatus C. Therefore, the frame supplied from the node apparatus F to the node apparatus B (the frame transmitted again by the node apparatus A) is unnecessary.

The unnecessary frame increases a load of the network. Therefore, such a frame is to be discarded. In the third concrete example, since the frame is discarded after the transfer count in the frame management table 13 is compared with the transfer count of the received frame, the load of the network is not generated.

The frame generated by the node apparatus A is transmitted to the server. Furthermore, since the frame transmitted from the node apparatus F is not registered in the frame management table 13 but is discarded, an information amount of the frame management table 13 is not increased. Consequently, a use amount of hardware may be suppressed.

Fourth Concrete Example

Next, a fourth concrete example will be described. In the fourth concrete example, a frame management table and a frame format will be described using the example of the ad-hoc network illustrated in FIG. 5. Referring to FIG. 5, a node apparatus A generates a frame. Then the node apparatus A transmits the frame to a node apparatus B.

In the fourth concrete example, a gateway apparatus GW1 may communicate with the server. Accordingly, the frame transmitted from the node apparatus B to the gateway apparatus GW1 is transmitted to a server from the gateway apparatus GW1.

FIG. 14 is a diagram illustrating frame management tables 13 and frame formats of the node apparatuses A and B. A transmission processor 14 of the node apparatus A generates a frame having FID of "1". GS of the generated frame is "A", and a transfer count is "0" which is an initial value. Accordingly, the transmission processor 14 stores information illustrated in FIG. 14.

GD of the frame represents the gateway apparatus GW1. A routing function unit 15 selects the node apparatus B as LD of the frame. LS of the frame is "A". Accordingly, the frame format of the frame transmitted by the node apparatus A has information illustrated in FIG. 14.

The node apparatus B stores information on the frame supplied from the node apparatus A. Therefore, the frame management table 13 of the node apparatus B stores the information illustrated in FIG. 14. In the frame format of the frame, a routing function unit 15 of the node apparatus B sets "GW1" as LD. LS is "B". Accordingly, the frame format of the frame transmitted by the node apparatus B has information illustrated in FIG. 14.

Fifth Concrete Example

Figure 15:
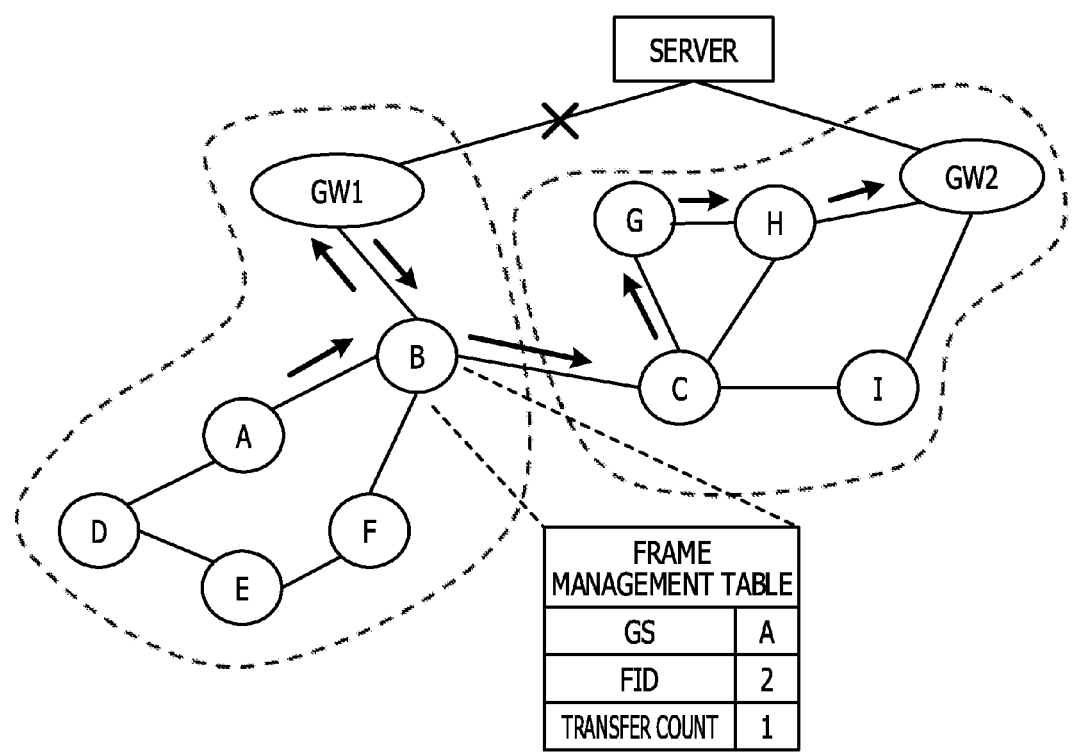
FIG. 15 is a diagram illustrating a fifth concrete example.

Next, a fifth concrete example will be described with reference to FIGS. 15 and 16. As illustrated in FIG. 15, node apparatuses A, B, D, E, and F belong to a group of a gateway apparatus GW1. Note that the gateway apparatus GW1 is a former gateway apparatus F-GW1 since communication between the gateway apparatus GW1 and a server is interrupted.

Node apparatuses C, G, H, and I belong to a group of a gateway apparatus GW2. Although the node apparatuses B and C belong to the different groups, the node apparatuses B and C may communicate with each other.

The node apparatus A generates a frame. GS of the frame is "A", FID is "2", and a transfer count is "0" which is an initial value. Furthermore, the node apparatus A has not recognized that communication between the former gateway apparatus F-GW1 and the server is interrupted, and therefore, "GD" is the gateway apparatus GW1. The gateway apparatus GW1 and the former gateway apparatus F-GW1 have the same address.

The node apparatus A transmits the generated frame to the node apparatus B. The node apparatus B stores information on the received frame in a frame management table 13. As illustrated in FIG. 16, in the frame management table 13 of the node apparatus B, GS is "A", FID is "2", and a transfer count is "0".

The node apparatus B transmits the frame to the former gateway apparatus F-GW1. The former gateway apparatus F-GW1 has been changed from the gateway apparatus GW1. Therefore, the transfer count of the frame is incremented and content of GD is changed to the gateway apparatus GW2. Thereafter, the former gateway apparatus F-GW1 transfers the frame to the node apparatus B.

The node apparatus B compares the transfer count stored in the frame management table 13 of the node apparatus B with the transfer count of the frame supplied from the former gateway apparatus F-GW1. Although the two node apparatuses B are described in FIG. 16, a transfer count denoted by hatching is a target of the comparison.

The transfer count in the frame management table 13 is "0" and the transfer count of the frame format is "1". Accordingly, since the determination in step S2 of FIG. 9 is negative, the frame is not discarded. Furthermore, the determination in step S4 of FIG. 9 is also negative, and an entry having FID of "2" of the frame management table 13 of the node apparatus B is deleted.

Then a table updating unit 24 updates the frame management table 13 in accordance with the frame format. The values in the frame management table 13 after the update are as follows: GS is "A", FID is "2", and the transfer count is "1".

The node apparatus B transmits the frame to the node apparatus C. The node apparatus C selects the node apparatus G as an appropriate route. Accordingly, the node apparatus C transmits the frame to the node apparatus G. The node apparatus G selects the node apparatus H as an appropriate route. Accordingly, the node apparatus G transmits the frame to the node apparatus H.

The node apparatus H transmits the frame to the gateway apparatus GW2 located adjacent to the node apparatus H. The gateway apparatus GW2 may communicate with the server. Therefore, the gateway apparatus GW2 transmits the received frame to the server. Accordingly, the frame generated by the node apparatus A may be transmitted to the server.

That is, even when communication between the gateway apparatus GW1 and the server is not available, the frame generated by the node apparatus A is not discarded and is transmitted to the server. Moreover, an amount of the information in the frame management table 13 of the node apparatus B is not changed, increase of hardware resources may be avoided.

Sixth Concrete Example

Figure 17:
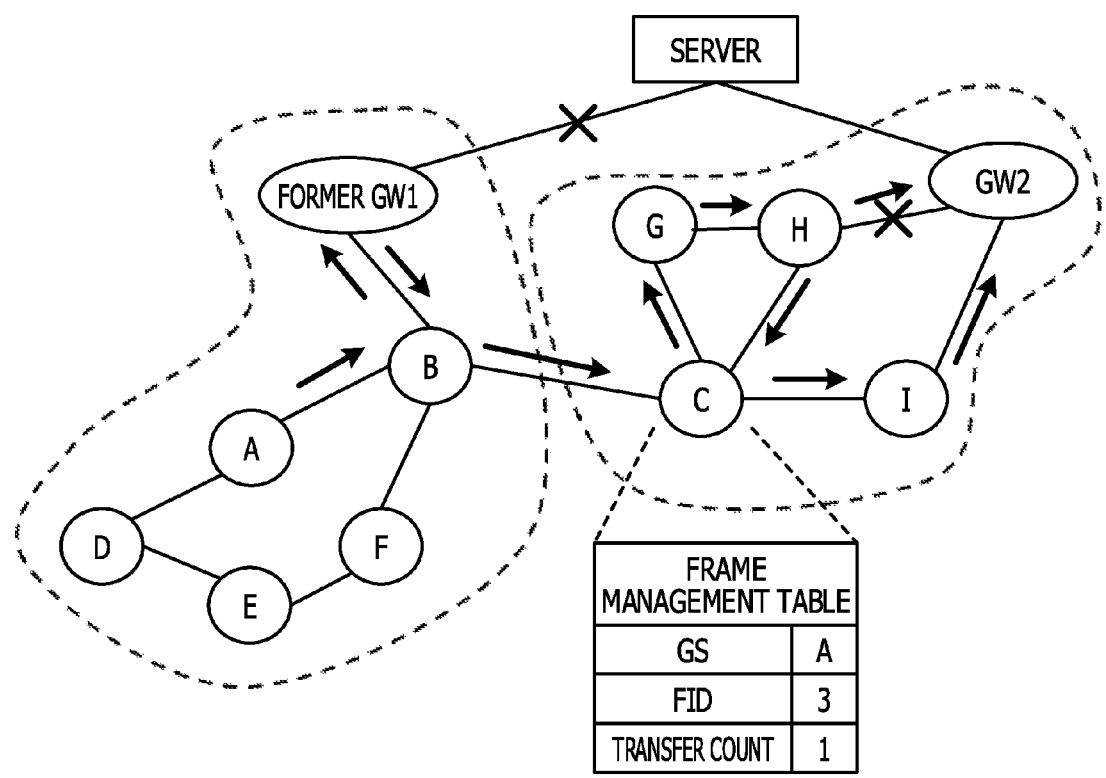
FIG. 17 is a diagram illustrating a sixth concrete example.

Next, a sixth concrete example will be described with reference to FIGS. 17 and 18. As illustrated in FIG. 17, communication between a gateway apparatus GW1 and a server is not available. Furthermore, communication between a node apparatus H and a gateway apparatus GW2 is also not available.

An ad-hoc network illustrated in FIG. 17 has a configuration the same as that in FIG. 15. A node apparatus A generates a frame. GS of the frame is "A", FID is "3", and a transfer count is "0" which is an initial value.

Furthermore, the node apparatus A does not recognize that communication between a former gateway apparatus F-GW1 and the server is interrupted, and therefore, GD is the gateway apparatus GW1. The gateway apparatus GW1 and the former gateway apparatus F-GW1 have the same address.

The node apparatus A transmits the generated frame to a node apparatus B. The node apparatus B transmits the frame to the former gateway apparatus F-GW1. The former gateway apparatus F-GW1 increments a transfer count of the frame and transfers the frame to the node apparatus B.

The node apparatus B transmits the frame to a node apparatus C. The node apparatus C stores information on the received frame in a frame management table 13. Since the transfer count of the frame is incremented to "1", the frame management table 13 stores GS of "A", FID of "3", and the transfer count of "1". Then the node apparatus C transmits the frame to a node apparatus G selected as an appropriate route.

The node apparatus G transmits the frame to the node apparatus H. The node apparatus H transmits the frame to the gateway apparatus GW2. However, since the communication between the node apparatus H and the gateway apparatus GW2 is not available, the node apparatus H transmits the frame to the node apparatus C.

The node apparatus C receives the frame. The node apparatus C compares the transfer count stored in the frame management table 13 of the node apparatus C with the transfer count of the frame supplied from the former gateway apparatus F-GW1. Although the two node apparatuses C are described in FIG. 18, a transfer count denoted by hatching is a target of the comparison.

The transfer count in the frame management table 13 is "1" and the transfer count of the frame format is also "1". Accordingly, since the determination in step S2 of FIG. 9 is negative, the frame is not discarded. Since the determination in step S4 of FIG. 9 is affirmative, the process in step S5 is not performed.

The node apparatus C transmits the frame to a node apparatus I. The node apparatus I transmits the frame to the gateway apparatus GW2. The gateway apparatus GW2 transmits the received frame to the server. In this way, the server receives the frame generated by the node apparatus A.

Accordingly, even when communication between the gateway apparatus GW1 and the server is not available and the communication between the node apparatus H and the gateway apparatus GW2 is not available, the frame is not discarded. By this, the frame generated by the node apparatus A may be transmitted to the server.

Seventh Concrete Example

Figure 19:
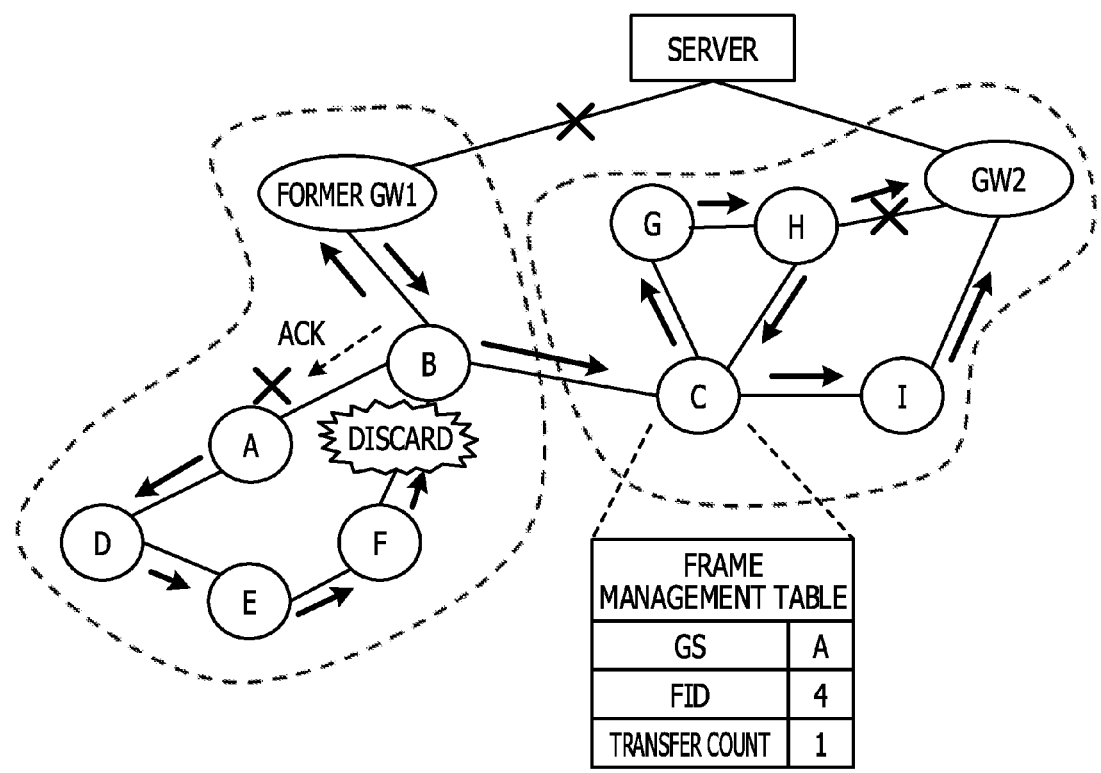
FIG. 19 is a diagram illustrating a seventh concrete example.

Next, a seventh concrete example will be described with reference to FIG. 19 and FIGS. 20A and 20B. As illustrated in FIG. 19, communication between a gateway apparatus GW1 and a server is not available. Furthermore, communication between a node apparatus H and a gateway apparatus GW2 is also not available.

A network configuration illustrated in FIG. 19 is the same as that in FIG. 15. In the network configuration of FIG. 19, a node apparatus A generates a frame. GS of the frame is "A", FID is "4", and a transfer count is "0" which is an initial value.

Furthermore, the node apparatus A does not recognize that the communication between a former gateway apparatus F-GW1 and the server is interrupted, and therefore, GD is the gateway apparatus GW1. The gateway apparatus GW1 and the former gateway apparatus F-GW1 have the same address.

The node apparatus A transmits the generated frame to a node apparatus B. Here, the node apparatus A does not receive Ack from the node apparatus B. When the node apparatus A does not receive Ack from the node apparatus B for a predetermined period of time, the node apparatus A transmits the frame again to a node apparatus D.

Information on the frame transmitted first from the node apparatus A to the node apparatus B is stored in a frame management table 13 of the node apparatus B. Thereafter, the node apparatus B transmits the frame to the former gateway apparatus F-GW1.

Since the former gateway apparatus F-GW1 has been changed from the gateway apparatus GW1, a transfer count of the frame is incremented and the frame is transferred to the node apparatus B. Since the transfer count of the frame management table 13 is "0" and the transfer count of the frame is "1", the node apparatus B does not discard the frame. Since the transfer count in the frame management table 13 is not equal to the transfer count of the frame, an entry is deleted and an entry is newly registered.

The node apparatus B transmits the frame to a node apparatus C. The node apparatus C transmits the frame to a node apparatus G as an appropriate route. The node apparatus G transmits the frame to the node apparatus H.

The node apparatus H may not transmit the frame to the gateway apparatus GW2. Therefore, the node apparatus H transmits the frame to the node apparatus C. The node apparatus C transmits the frame to a node apparatus I. The node apparatus I transmits the frame to the gateway apparatus GW2. The gateway apparatus GW2 transmits the received frame to the server. Accordingly, the server receives the frame generated by the node apparatus A.

Next, a case where the node apparatus A transmits the frame again to the node apparatus D will be described. The node apparatus A does not receive Ack from the node apparatus B, and therefore, the node apparatus A transmits a frame having different LD to the node apparatus D. The node apparatus D transmits the frame to a node apparatus E. The node apparatus E transmits the frame to a node apparatus F. The node apparatus F transmits the frame to the node apparatus B.

FIG. 20A is a diagram illustrating frame management tables and frame formats in a route of the frame normally transmitted (that is, the frame transmitted first by the node apparatus A). FIG. 20B is a diagram illustrating frame management tables and frame formats in a route of the frame to be discarded (that is, the frame transmitted again by the node apparatus A).

As illustrated in FIG. 20A, in the frame management table 13 of the node apparatus B, a transfer count is "1" (a hatched portion in FIG. 20A). On the other hand, in a frame format in which LD is the node apparatus B in FIG. 20B, a transfer count is "0" (a hatched portion in FIG. 20B).

Accordingly, the determination is affirmative in step S2 of FIG. 9. Accordingly, the second frame transmitted from the node apparatus A through the node apparatus D is discarded. However, the first frame transmitted from the node apparatus A through the node apparatus B is supplied from the gateway apparatus GW2 to the server. Accordingly, the frame generated by the node apparatus A may be transmitted to the server.

Hardware Configuration of Communication Apparatus

Figure 21:
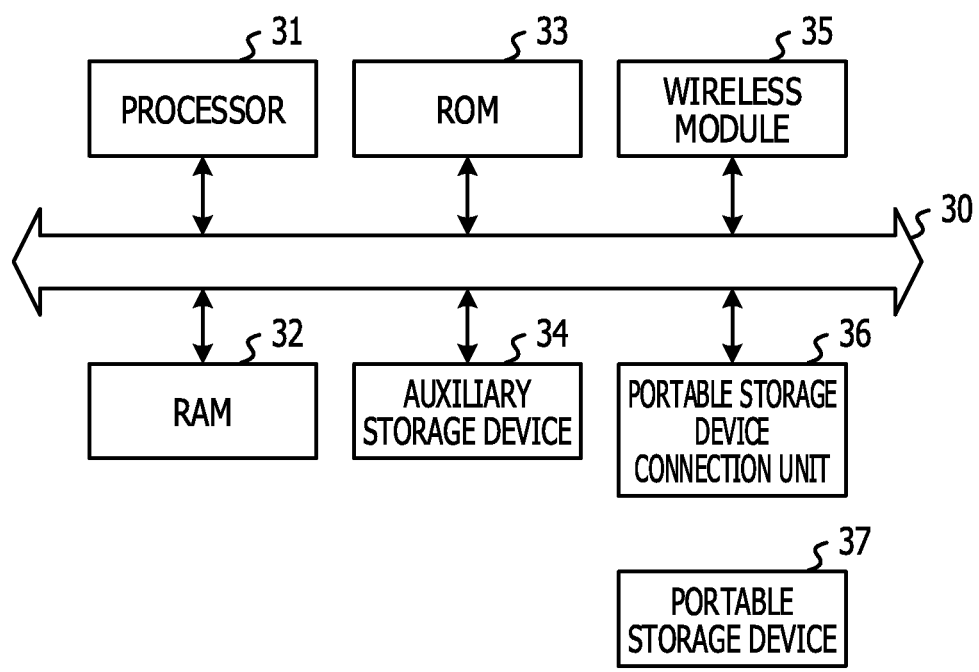
FIG. 21 is a diagram illustrating an example of a hardware configuration of the communication apparatus.

Next, an example of a hardware configuration of the communication apparatus 1 will be described. As illustrated in FIG. 21, in the communication apparatus 1, a processor 31, a random access memory (RAM) 32, a read only memory (ROM) 33, an auxiliary storage device 34, a wireless module 35, and a portable storage device connection unit 36 are connected to a bus 30.

The processor 31 is an arbitrary processing circuit such as a central processing unit (CPU). The processor 31 executes programs developed in the RAM 32. The ROM 33 is a nonvolatile storage device which stores the programs developed in the RAM 32. The programs developed in the RAM 32 may be stored in the auxiliary storage device 34. Examples of the storage device include a flash memory and a hard disk drive.

The wireless module 35 is a communication interface having a function of allowing the communication apparatus 1 to perform wireless communication with another communication apparatus. Communication between node apparatuses and communication between a node apparatus and a gateway apparatus are performed through the wireless module 35.

The portable storage device connection unit 36 is connectable to a portable storage device. Examples of the portable storage device 37 include a portable memory and an optical disk (such as a compact disk (CD) or a digital video disk (DVD)).

The RAM 32, the ROM 33, and the auxiliary storage device 34 are examples of a computer readable storage device which is materialized. The materialized storage medium is not a temporary medium such as a signal carrier.

For example, the reception unit 11 and the transmission unit 17 may be realized by the wireless module 35. The reception processor 12, the transmission processor 14, and the routing function unit 15 may be realized by the processor 31. The frame management table 13 and the routing table 16 may be realized by the auxiliary storage device 34.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
a plurality of computer nodes comprising one or more processors and memory;
a first apparatus, of the plurality of computer nodes, that receives first data and subsequently forwards first data to a server apparatus;
a second apparatus, of the plurality of computer nodes, and
a third apparatus, of the plurality of computer nodes, configured to transmit second data to the first apparatus and set a number of transfers of the second data, the second data including a destination of the second data and the number of transfers of the second data, the number of transfers of the second data being a number of times the second data is transferred between the plurality of nodes,
wherein the first apparatus being configured to:
receive the second data from the third apparatus, the destination of the received second data corresponding to the first apparatus,
determine whether communication between the first apparatus and the server apparatus has been interrupted, and
in response to determining that the communication has been interrupted:
update the destination of the second data to correspond to the second apparatus and update the number of transfers in the second data, to generate updated data, and transmit the updated data to the third apparatus, and
the third apparatus being configured to:
determine whether the number of transfers in the updated data is equal to or smaller than a transfer limit, and
in response to determining the number of transfers in the updated data is equal to or smaller than the transfer limit, and the destination of the updated data corresponding to the second apparatus, transmit the updated data to the second apparatus to forward the updated data to the server apparatus.

2. The system according to claim 1, wherein the third apparatus is configured to discard the updated data when the updated number of transfers is larger than the transfer limit.

3. The system according to claim 1, wherein the third apparatus is configured to update the number of transfers when the updated number of transfer is equal to or smaller than the transfers limit.

4. The system according to claim 1, wherein the third apparatus is configured to delete information on other data having an identifier which is the same as an identifier of the received data and newly register information on the received data.

5. The system according to claim 1, wherein, in response to discarding the updated data because the number of transfers is greater than the transfer limit, the third apparatus is configured to, when newly creating new data, set the number of transfers of the new data to an initial value.

6. The system according to claim 1, wherein the first apparatus is configured to update the number of transfers of the received data by incrementing the number of transfers of the received data.

7. A method comprising:
transmitting, via the first apparatus, first data to a server apparatus;
transmitting, via a third apparatus, second data to the first apparatus and recording a number of transfers of the second data, the second data including information on a destination of the second data and the number of transfers, the number of transfers of the second data being a number of times the second data is transferred between the plurality of computer nodes;
determining, via the first apparatus, whether communication between the first apparatus and the server apparatus has been interrupted;
in response to the determining that the communication has been interrupted, setting, via the first apparatus, the destination to a second apparatus and updating the number of transfers, to generate updated data, and transmitting the updated data to the third apparatus;
determining, via the third apparatus, whether the number of transfers of the updated data is equal to or smaller than a transfer limit; and
in response to the determining the number of transfers in the updated data is equal to or smaller than the transfer limit, and the destination of the updated data corresponding to the second apparatus, transmitting, via the third apparatus, the updated data to the second apparatus to forward the updated data to the server apparatus.

8. A non-transitory computer-readable medium including a program, which when executed by at least one computer node of a plurality of computer nodes, causes the at least one computer node to execute a process, the process comprising:
transmitting, via first computer of the plurality of computer nodes, first data to a server apparatus;
transmitting, via the third apparatus, second data to the first apparatus and recording a number of transfers of the second data, the second data including information on a destination of the second data and the number of transfers, the number of transfers of the second data being a number of times the second data is transferred between the plurality of computer nodes;
determining, via the first apparatus, whether communication between the first apparatus and the server apparatus has been interrupted;
in response to the determining that the communication has been interrupted, setting, via the first apparatus, the destination to a second apparatus and updating the number of transfers to generate updated data, and transmitting the updated data to the third apparatus;
determining, via the third apparatus, whether the number of transfers of the updated data is equal to or smaller than a transfer limit; and
in response to the determining the number of transfers in the updated data is equal to or smaller than the transfer limit, and the destination of the updated data corresponding to the second apparatus, transmitting, via the third apparatus, the updated data to the second apparatus to forward the updated data to the server apparatus.

* * * * *